(12) United States Patent
Perry et al.

(10) Patent No.: US 10,720,652 B2
(45) Date of Patent: Jul. 21, 2020

(54) BATTERY RECYCLING SYSTEMS AND METHODS ASSOCIATED WITH CELL SITES AND THE LIKE

(71) Applicant: ETAK Systems, LLC, Huntersville, NC (US)

(72) Inventors: James Perry, Princeton, MA (US); Lee Priest, Charlotte, NC (US)

(73) Assignee: ETAK Systems, LLC, Huntersville, NC (US)

( * ) Notice: Subject to any disclaimer, the term of this patent is extended or adjusted under 35 U.S.C. 154(b) by 223 days.

(21) Appl. No.: 15/655,272

(22) Filed: Jul. 20, 2017

(65) Prior Publication Data

US 2018/0034068 A1 Feb. 1, 2018

Related U.S. Application Data

(63) Continuation-in-part of application No. 15/628,070, filed on Jun. 20, 2017, and a continuation-in-part of application No. 15/221,866, filed on Jul. 28, 2016.

(51) Int. Cl.
*H01M 6/52* (2006.01)
*H01M 6/50* (2006.01)
(Continued)

(52) U.S. Cl.
CPC .......... *H01M 6/52* (2013.01); *H01M 6/5066* (2013.01); *H01M 10/54* (2013.01); *H01M 2/10* (2013.01);
(Continued)

(58) Field of Classification Search
CPC ........ G06Q 10/30; G06Q 50/28; G06Q 10/06; G06Q 10/087; G06Q 10/08; B65F 1/1468; B65F 3/001; H01M 6/52
(Continued)

(56) References Cited

U.S. PATENT DOCUMENTS 3,999,775 A * 12/1976 Brongo .................. B62B 3/003
                                                         280/79.2
8,291,835 B2 * 10/2012 Gordon .............. B65D 19/0016
                                                         108/51.3
(Continued)

FOREIGN PATENT DOCUMENTS

JP 02276725 A * 11/1990 ................ B25J 9/22
JP 07210227 A * 8/1995 ......... G05B 19/4093

OTHER PUBLICATIONS

Call 2 Recycle, "5 Simple Steps," [online], archived on Oct. 13, 2011, available at: < https://web.archive.org/web/20111013163528/http://call2recycle.org/doc_lib/C2R257_5_Steps_Generic.pdf > last accessed Apr. 25, 2019 (Year: 2011).*

(Continued)

*Primary Examiner* — Minnah L Seoh
*Assistant Examiner* — Richard W. Crandall
(74) *Attorney, Agent, or Firm* — Clements Bernard Walker; Lawrence A. Baratta, Jr.

(57) ABSTRACT

A battery recycling method used to recycle used batteries from one or more cell sites includes uniquely identifying and marking the used batteries at the one or more cell sites; packaging and removing the used batteries from the one or more cell sites to a staging facility; packaging the used batteries from a plurality of cell sites at the staging facility with a insulation material; providing the packaged used batteries from the plurality of cell sites to a recycling facility; tracking the used batteries at each foregoing step; and providing a recycling certificate to an operator of the one or more cell sites evidencing successful recycling of the used batteries.

11 Claims, 12 Drawing Sheets

(51) Int. Cl.
H01M 10/54 (2006.01)
H01M 2/20 (2006.01)
H01M 2/34 (2006.01)
H01M 2/10 (2006.01)

(52) U.S. Cl.
CPC ............ *H01M 2/206* (2013.01); *H01M 2/341* (2013.01); *Y02W 30/84* (2015.05)

(58) Field of Classification Search
USPC ........................................................ 705/308
See application file for complete search history.

(56) References Cited

U.S. PATENT DOCUMENTS

| | | | | |
|---|---|---|---|---|
| 2004/0149821 A1* | 8/2004 | Aptekar | ................. | G06Q 10/08 235/385 |
| 2009/0321511 A1* | 12/2009 | Browne | .................. | B03B 9/061 235/375 |
| 2011/0225098 A1* | 9/2011 | Wolff | ...................... | G06Q 10/30 705/308 |
| 2012/0029985 A1* | 2/2012 | Wilson | ................... | G06Q 10/30 705/14.11 |
| 2014/0246347 A1* | 9/2014 | Burkardt | ................ | B65D 5/505 206/386 |

OTHER PUBLICATIONS

Wireless Estimator, "Technician accused of stealing over 4,000 cell site batteries during Northeast crime spree," [online], published May 27, 2015, available at: < http://wirelessestimator.com/articles/2015/technician-accused-of-stealing-over-4000-cell-site-batteries-during-northeast-crime-spree/ > (Year: 2015).*
Gooley, "The Basics of Battery Recycling," DC Velocity [online], available at: < https://www.dcvelocity.com/articles/20120723-the-basics-of-battery-recycling/ > (Year: 2012).*
SBS Portable Battery Chargers [online], archived on Dec. 20, 2015, < https://web.archive.org/web/20151220040945/http://www.sbsbattery.com/products-services/by-application/motive-power-batteries/material-handling-battery-handling-systems/portable-battery-changers.html > (Year: 2015).*
"Stacking and Wrapping New and Used Batteries," BatteryCouncil.org [online], published on Jan. 1, 2015, available at:< https://cdn.ymaws.com/batterycouncil.org/resource/resmgr/Transportation_Flyers/Stacking_and_Wrapping_New_an.pdf > (Year: 2015).*
Call 2 Recycle, "5 Simple Steps," [online], archived on Oct. 13, 2011, available at: < https://web.archive.org/web/20111013163528/http://call2recycle.org/doc_lib/C2R257_5_Steps_Generic.pdf > (Year: 2011).*
Wireless Estimator, "Technician accused of stealing over 4,000 cell site batteries during Northeast crime spree," [online], published May 27, 2015, available at: < http://wirelessestimator.com/articles/2015/technician-accused-of-stealing-over-4000-cell-site-batt (Year: 2015).*
Call 2 Recycle, "Certifications," [online], archived on Oct. 27, 2011, available at: < https://web.archive.org/web/20111027171222/http://www.call2recycle.org/certifications-audits.php? > (Year: 2011).*
Gooley, "The Basics of Battery Recycling," DC Velocity [online], available at: < https://www.dcvelocity.com/articles/20120723-the-basics-of-battery-recycling/ >, published on Jul. 23, 2012 (Year: 2012).*
SBS Portable Battery Chargers [online], archived on Dec. 20, 2015, available at: < https://web.archive.org/web/20151220040945/http://www.sbsbattery.com/products-services/by-application/motive-power-batteries/material-handling-battery-handling-systems/portable-battery-ch.*

Battery Solutions, [online], published on Mar. 31, 2014, available at: <https://www.batterysolutions.com/content/themes/batterysolutions/assets/pdf/Wet_Cell_Battery_Packaging_Instructions.pdf >.*
Energy Products, [online], archived on Jan. 8, 2016, available at: < https://web.archive.org/web/20160108141317/http://www.energyprod.com/telecom-decommissioning/ > (Year: 2016).*
SelectaMark, "Asset Tags Explained—Exploring how Asset Tags Safeguard your Property," [online], archived on Oct. 12, 2015, available at: < https://web.archive.org/web/2015*/https://www.selectamark.co.uk/asset-tags-explained-exploring-how-asset-tags-safeguard-your-property > (Year: 2015).*
MaverickLabel.com, "5 Ways Asset Labels Prevent Theft," [online], published on Jul. 10, 2013, available at: < https://www.mavericklabel.com/blog/5-ways-asset-labels-prevent-theft/ > (Year: 2013).*
Traveling Mark, "Stop Theft Tag, Security Tracking of Office Property," [online], published on Feb. 4, 2010, available at: < https://www.travelingmark.com/reviews/stop-theft-tag-security-tracking-of-office-property/ > (Year: 2010).*
FedEx, Packaging Guidelines for Battery Shipments, published in 2009, available at: < http://images.fedex.com/us/packaging/guides/BatteryShipments_fxcom.pdf > with an Internet Archive (available at archive.org) on May 8, 2016. (Year: 2016).*
Veolia Environmental Services, published in 2013, [online] available at: < http://sydist.com/Portals/0/Literature/VeoliaPackaging-GuidelinesMay2013.pdf > (Year: 2013).*
Village Volunteers: Guide to Proper Battery Disposal, published in 2011, [online] available at: < https://villagevolunteers.org/wp-content/uploads/2011/07/Battery-Storage-Disposal.pdf > published on 2011 (Year: 2011).*
Call 2 Recycle, "Physical Flow Chart," [online], archived on Oct. 27, 2011, available at: < https://web.archive.org/web/20111027180107/http://www.call2recycle.org/program-physical-flow-chart.phpc=1&d=366&e=493&w=2&r=Y > (Year: 2011).*
Energy Products: Telecom Decommissioning, [online] published Jan. 2016, available at: < https://web.archive.org/web/20160108141317/http://www.energyprod.com/telecom-decommissioning/ > (Year: 2016).*
USDOT 49 CFR 173 Final Rule, as published in 80 Fed Reg 225, pp. 72924-72929, Nov. 23, 2015, (Year: 2015).*
Leonard's Guide, p. 3 [online], archived in 2010, available at: < https://web.archive.org/web/20100123085047/http://www.leonardsguide.com/wlt-hazmat-trucking-3.shtml > (Year: 2010).*
CEC, "Environmentally Sound Management of Spent Lead-Acid Batteries in North America," published on Jan. 2016, available at: < http://www3.cec.org/islandora/en/item/11665-environmentally-sound-management-spent-lead-acid-batteries-in-north-america-en.pdf > (Year: 2016).*
SBS Portable Battery Chargers [online], archived on Dec. 20, 2015, available at: < https://web.archive.org/web/20151220040945/http://www.sbsbattery.com/products-services/by-application/motive-power-batteries/material-handling-battery-handling-systems/portable-battery-changers.html > (Year: 2015).*
Battery Solutions, [online], published on Mar. 31, 2014, available at: <https://www.batterysolutions.com/content/themes/batterysolutions/assets/pdf/Wet_Cell_Battery_Packaging_Instructions.pdf > (Year: 2014).*
"Do's and Don'ts of Palletizing," [online], published on Jul. 21, 2015, available at: < https://www.plslogistics.com/blog/dos-and-donts-of-palletizing/ > (Year: 2015).*
Metech Recycling, IT Asset Management (ITAM), [online], archived on Mar. 6, 2016 < https://web.archive.org/web/20160306093116/http://www.metechrecycling.com/services/itam/ > (Year: 2016).*
C&D Technologies Battery Program, archived in 2015, [online], available at: <https://web.archive.org/web/20150928030338/https://www.cdtechno.com/resource/asset/recycle_program_rev_4.pdf>(Year: 2015).*
Veolia Environmental Services, published in 2011 [online], available at: < http://www.sydist.com/Portals/0/Literature/RecyclingProgramBatteryPackagingGuidelines.pdf>(Year: 2011).*

* cited by examiner

US 10,720,652 B2

BATTERY RECYCLING SYSTEMS AND METHODS ASSOCIATED WITH CELL SITES AND THE LIKE

CROSS-REFERENCE TO RELATED APPLICATION(S)

The present patent/application is a continuation-in-part of the following patents/applications, each of which is incorporated by reference in full:

| Filing Date | Ser. No. | Title |
| --- | --- | --- |
| Jun. 20, 2017 | 15/628,070 | BATTERY INSTALLATION WITH SECURITY SCREWS FOR THEFT DETERRENCE IN CELL SITE SHELTERS AND THE LIKE |
| Jul. 28, 2016 | 15/221,866 | BATTERY INSTALLATION IMPROVEMENT APPARATUS AND METHOD IN CELL SITE SHELTERS AND THE LIKE |

FIELD OF THE DISCLOSURE

The present disclosure generally relates to battery recycling systems and methods. More particularly, the present disclosure relates to battery recycling systems and methods in cell site shelters and the like.

BACKGROUND OF THE DISCLOSURE

Due to the geographic coverage nature of wireless service, there are hundreds of thousands of cell towers in the United States. With over 200,000 cell sites in the U.S., geographically distributed everywhere, installation and maintenance at cell sites can be expensive, time-consuming, and complex. For example, cell sites include a shelter or cabinet located proximate to the cell tower. For network availability, the shelter or cabinet include a battery backup for power redundancy when a primary power source is unavailable, such as commercial power. For example, depending on configuration, the battery backup may include 4, 8, 16, 48, etc. batteries which each can weigh several hundred pounds. The installation/removal process such batteries is labor intensive and slow. It would be advantageous to provide a battery installation improvement apparatus and method in cell site shelters and the like to address the labor intensity and speed.

Currently, operators are dealing with high battery theft rates. Former technicians, employees, and subcontractors with known site access information makes removal of batteries an easy target as in many cases no forced entry is required, in addition to third parties who simply break in. Batteries are either delivered directly to or are picked up by smelters and recyclers in exchange for currency based on lead content and weight—and thus can return a high dollar amount.

Additionally, with hundreds of thousands of batteries installed at existing cell sites—and given an average of 5 years of life expectancy—there is a continuous need to monitor and replace batteries. With ever increasing Environmental, Health & Safety (EH&S) regulations and requirements put on wireless carriers, there is a growing need to efficiently and properly remove, dispose, and recycle used batteries. Proper handling, packaging, storage, and transportation of batteries in the recycling process is a critical component of battery replacement services. A clear chain of custody is required from the original removal of batteries at cell sites through the final recycling certificate showing completion of proper disposal.

BRIEF SUMMARY OF THE DISCLOSURE

In an exemplary embodiment, a battery recycling method used to recycle used batteries from one or more cell sites includes uniquely identifying and marking the used batteries at the one or more cell sites; packaging and removing the used batteries from the one or more cell sites to a staging facility; packaging the used batteries from a plurality of cell sites at the staging facility with a insulation material; providing the packaged used batteries from the plurality of cell sites to a recycling facility; tracking the used batteries at each foregoing step; and providing a recycling certificate to an operator of the one or more cell sites evidencing successful recycling of the used batteries. The tracking can be via a mobile device in communication with one of a back-end server and a cloud system?. The one of a back-end server and a cloud system can be integrated with a system associated with the operator for communicating status, providing the recycling certificate, and for scheduling the battery recycling. The battery recycling method can further include providing a notification to the operator prior to, concurrent with, or subsequent to the removing, wherein the notification provides an indication a provider performing the battery recycling method has taken ownership of the used batteries.

The removing can utilize a battery installation apparatus to physically move the used batteries out of the one or more cell sites, wherein the battery installation apparatus comprises a plurality of adjustable shelves and omnidirectional wheels. The packaging the used batteries from the plurality of cell sites can include placing an insulation sheet on an empty pallet; placing the used batteries on the insulation sheet; and repeating to provide a plurality of rows of the used batteries on the pallet. Each row has the insulation sheet therebetween and a top row has a top insulation sheet thereon. The insulation sheet can include markings of where to place the used batteries and identifiers for each location for the tracking. The packaging the used batteries from the plurality of cell sites can further include placing a strap made of insulating material to tie down the used batteries on the pallet; and wrapping the pallet with shrink wrap. The packaging the used batteries from the plurality of cell sites can further include placing a piece of insulating tape over each terminal on the used batteries.

In an exemplary embodiment, a battery installation method in a shelter or cabinet includes placing one or more batteries in the shelter or cabinet; connecting terminals on each of the one or more batteries to associated terminal plates with associated security screws; and connecting a bracket to a housing in the shelter or cabinet with associated security screws, wherein the bracket spans across the one or more batteries. The security screws can be installed with a unique tool specially designed for the associated security screws to deter tampering. The security screws can include spanner screws, one-way screws, or tamper-resistant Allen-head screws each with a protruding pin. The security screws can include uniquely designed screw heads with a corresponding unique tool.

The placing can include placing the one or more batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the one or more batteries from the shelves to the battery system. The battery installation method can further include moving the battery installation apparatus into the shelter or cabinet to the location; removing old batteries from the battery system and placing the old batteries on the shelves; moving the battery installation apparatus out of the shelter or cabinet; and removing the old batteries.

In an exemplary embodiment, a battery installation method in a shelter or cabinet includes placing a plurality of batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the plurality of batteries from the shelves to the battery system. The battery installation method can further include, prior to the placing: moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The plurality of batteries can include N batteries, N=4, 8, 16, 24, or 48. The method can be performed by a single installer. The shelter or cabinet can be at a cell site.

In another exemplary embodiment, a battery installation apparatus for installing and removing batteries in a shelter or cabinet includes a frame comprising four posts, wherein the frame is dimensioned to maneuver in the shelter or cabinet; a lower shelf fixed to the frame; an upper shelf moveable on the frame, wherein each of the lower shelf and the upper shelf are dimensioned to support the batteries; and omnidirectional wheels disposed to each of the four posts.

To install the batteries, a plurality of batteries are placed on the lower shelf and the upper shelf; the frame is moved into the shelter or cabinet to a location proximate and adjacent to a battery system in the shelter or cabinet; the upper shelf is adjusted based on the battery system; and each of the plurality of batteries is moved to the battery system. To remove the batteries, the frame is moved into the shelter or cabinet to a location proximate and adjacent to a battery system in the shelter or cabinet; old batteries from the battery system are placed on the upper shelf and the lower shelf; the frame is moved out of the shelter or cabinet; and the old batteries are removed.

The frame can be dimensioned based on a size of the battery system and a size of the shelter or cabinet. The battery installation apparatus can further include a pulley system coupled to the four posts to vertically raise and lower a shelf of the shelves. The pulley system can include a handle which is rotated to move the upper shelf and which holds the upper shelf when the handle is stationary. The installation apparatus can include a rectangular shape. The plurality of batteries can include N batteries, N=4, 8, 16, 24, or 48. The battery installation apparatus can be operated by a single installer. The shelter or cabinet can be at a cell site.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is a flowchart of a battery installation method with security screws for theft deterrence in cell site shelters and the like;

DETAILED DESCRIPTION OF THE DISCLOSURE

In various exemplary embodiments, the present disclosure relates to battery recycling systems and methods such as with respect to cell sites. Specifically, the battery recycling systems and methods provide an efficient, safe, and verifiable approach to recycling batteries. The systems and methods track used (spent) batteries from the deinstallation process at a cell site through final recycling evidenced by a recycling certificate. The systems and methods include various tracking techniques such as implemented through mobile devices and cloud systems.

Also, in various exemplary embodiments, the present disclosure relates to a battery installation with security screws for theft deterrence in cell site shelters and the like. Specifically, the battery installation utilizes security screws in various configurations for anchoring and securing batteries on site, such as at a cell site. Further, a method of installation is also described. The security screws require a specialized bit or tool for locking and tightening. Batteries can be anchored to terminal plates with the security screws. Further, the batteries can be locked together with one another forming a single unit, increasing the weight and bulk of the single unit presenting significant challenges to remove the batteries. Even further, brackets can be used with the security screws to attach the batteries to a shelf, cabinet, etc.

Also, in various exemplary embodiments, the present disclosure relates to a battery installation improvement apparatus and method in cell site shelters and the like. The apparatus includes an adjustable rack dimensioned to fit into small telecom cabinets or shelters and used to remove old batteries and install new batteries quickly (i.e., multiple batteries at a time) and efficiently (i.e., less labor required). The adjustable rack includes omnidirectional wheels and can be maneuvered/positioned in the shelter adjacent to a battery system. The adjustable rack includes adjustable shelves which can be positioned adjacent to old batteries for removal thereof, the apparatus can be wheeled out of the shelter to remove the old batteries, new batteries can be placed on the adjustable shelves, which can be positioned at appropriate heights based on the removal, and the apparatus can be maneuvered/positioned back to the battery system where the new batteries are provided. Advantageously, the apparatus can be used by a single installer, more than doubling the efficiency in removing/installing batteries. Also, in an exemplary embodiment, the apparatus can be used in conjunction with the security screws and installation approach.

§ 1.0 Exemplary Cell Site

Figure 1:
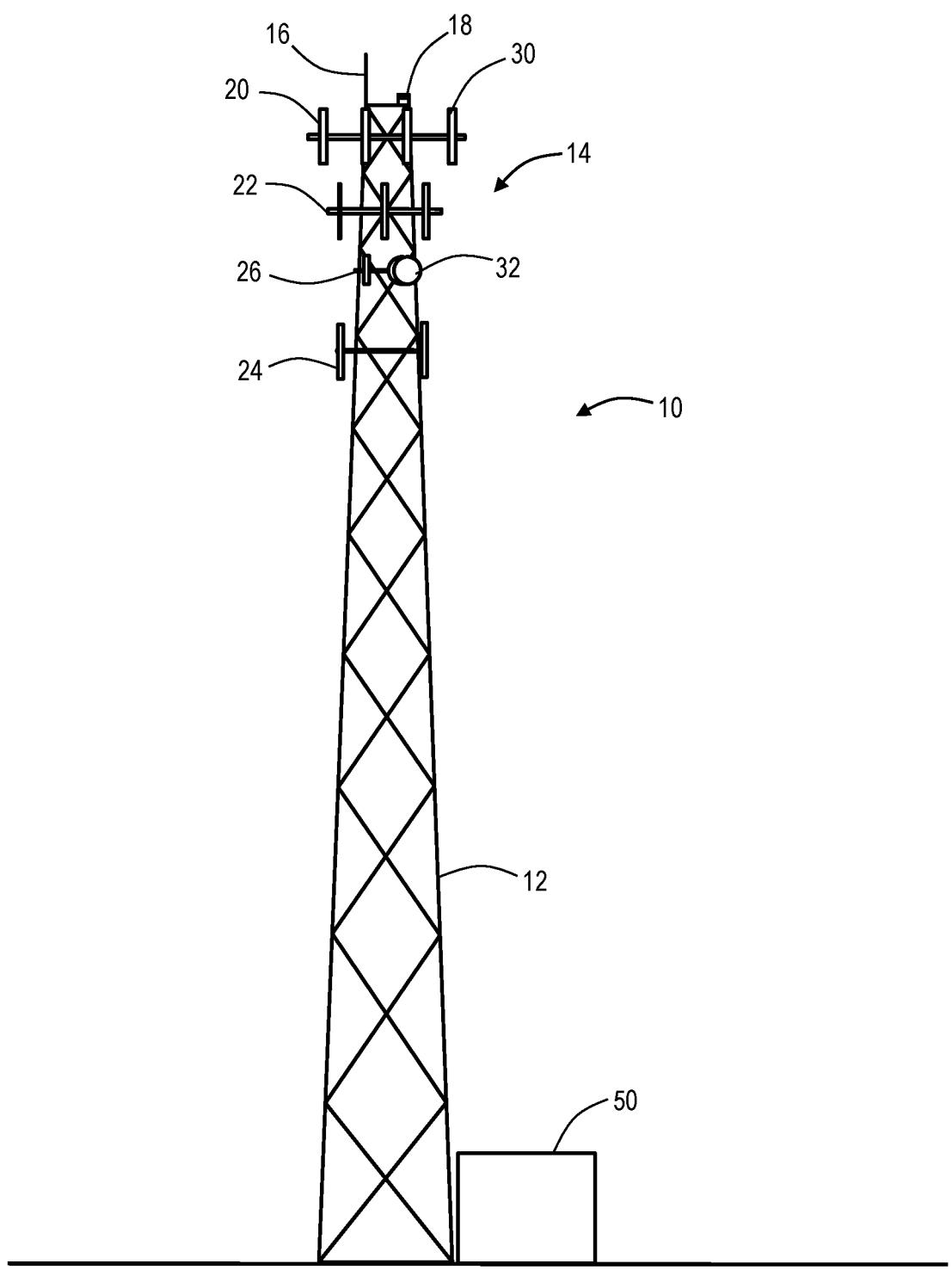
FIG. 1 is a diagram of an exemplary cell site.

Referring to FIG. 1, in an exemplary embodiment, a diagram illustrates a side view of an exemplary cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lightning rod 16, a warning light 18, etc. Of course, there may be various additional components associated with the cell tower 12 and the cell site 10 which are omitted for illustration purposes. In this exemplary embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g. there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

To support the various cell site components and their operation thereof, the cell site 10 includes a shelter 50 (which can also be referred to as a cabinet, house, etc.) which include electronics and other networking equipment to support the functionality and operation. The shelter 50 can include a battery system which supports power for the various equipment at the cell site 10 when a primary power source is unavailable. The present disclosure relates to an apparatus and method for improving installation efficiency of individual batteries in the battery system. The apparatus and method are illustrated herein referencing the cell site 10 and the shelter 50, but those of ordinary skill in the art will recognize other applications are also contemplated in the telecom and data communications space.

§ 2.0 Exemplary Shelter

Figure 2:
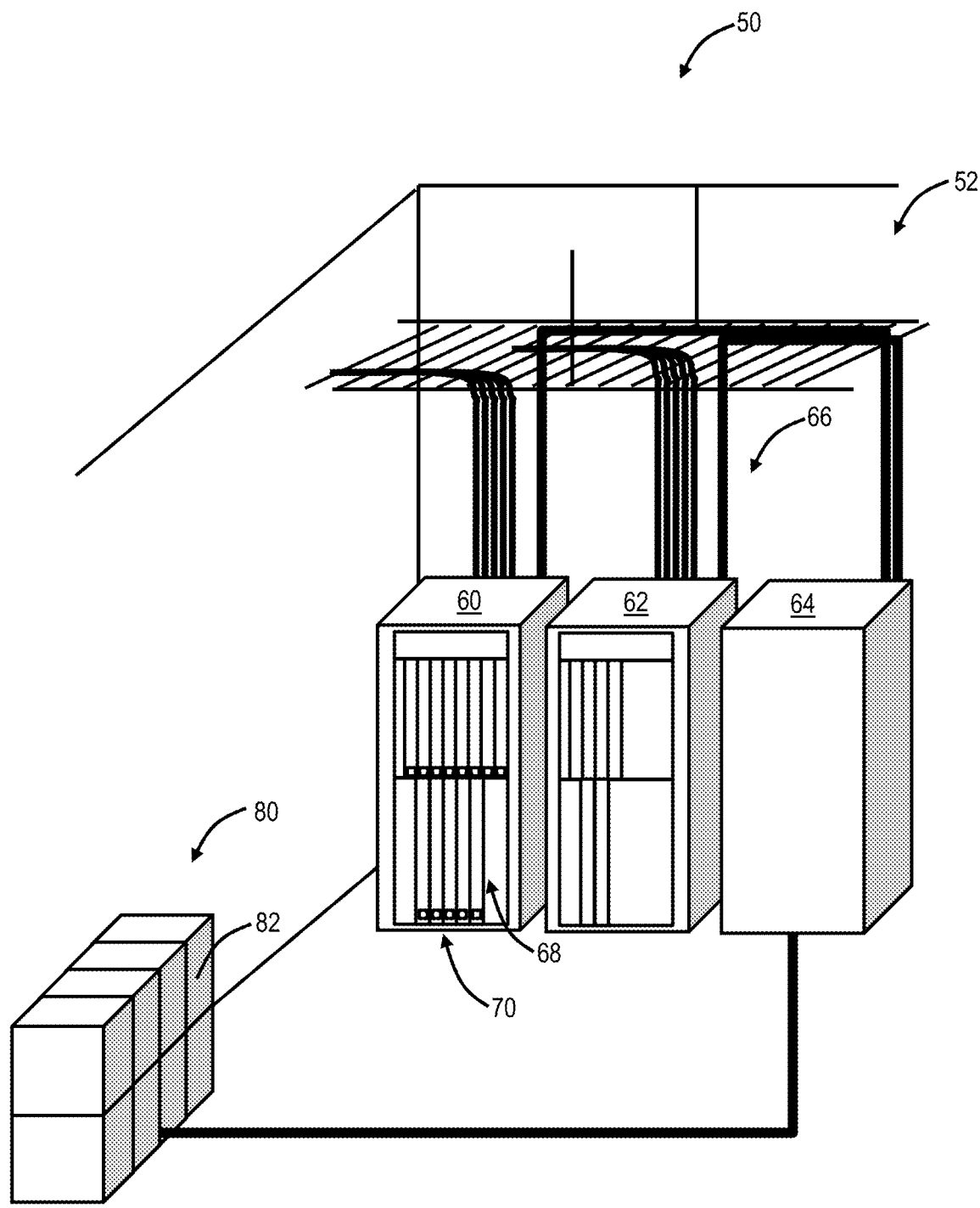
FIG. 2 is a diagram of an exemplary interior of a shelter at the cell site.

Referring to FIG. 2, in an exemplary embodiment, a diagram illustrates an exemplary interior 52 of a shelter 50 at the cell site 10. Generally, the shelter 50 houses equipment associated with the cell site 10 such as wireless RF terminals 60 (e.g., LTE terminals), wireless backhaul equipment 62, power distribution 64, and the like. Generally, wireless RF terminals 60 connect to the cell site components 14 for providing associated wireless service. The wireless backhaul equipment 62 includes networking equipment to bring the associated wireless service signals to a wireline network, such as via fiber optics or the like. The power distribution 64 provides power for all of the equipment such as from the grid as well as a battery backup to enable operation in the event of power failures. Of course, additional equipment and functionality are contemplated in the interior 52. The terminals 60, equipment 62, and the power distribution 64 can be realized as rack or frame mounted hardware with cabling 66 and with associated modules 68. The modules 68 can be pluggable modules which are selectively inserted in the hardware and each can include unique identifiers 70 such as barcodes, Quick Response (QR) codes, RF Identification (RFID), physical labeling, color coding, or the like. Each module 918 can be unique with a serial number, part number, and/or functional identifier. The modules 68 are configured as needed to provide the associated functionality of the cell site.

The power distribution 64 can receive power from a primary source which is typically a local power provider. To support resiliency and redundancy when the primary source is unavailable, e.g., during a power outage, the shelter 50 can include a battery system 80 which can also be coupled to the power distribution 64. The present disclosure relates to an apparatus which is maneuverable in the shelter 50 to remove/install batteries in the battery system 80.

§ 3.0 Battery System for a Shelter or the Like

Figure 3:
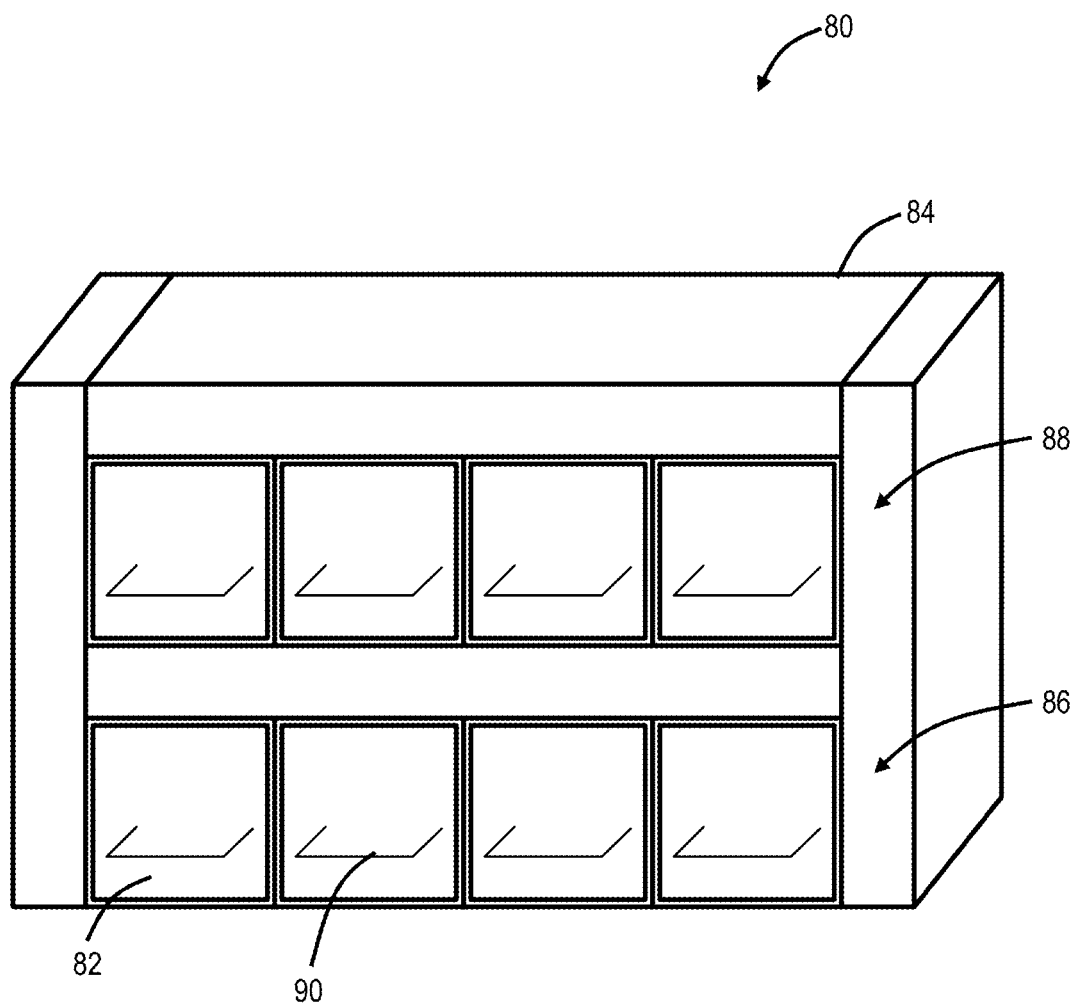
FIG. 3 is a block diagram of an exemplary battery system.

Referring to FIG. 3, in an exemplary embodiment, a block diagram illustrates an exemplary battery system 80. The battery system 80 can include N batteries 82, N being an integer such as 4, 8, 16, 48, etc. (N=8 in the example of FIG. 3). The number of batteries 82 is selected based on the amount of equipment associated with the cell site 10 and the amount of backup time desired. Typically, the number of batteries is 4 or more. The battery system 80 can include a housing 84, such as a frame, rack, etc. with openings for each of the batteries 82. For example, the housing 84 can have a rectangular shape with rows 86, 88 of the batteries 82 at various heights. The example of FIG. 3 includes two rows 86, 88, but other embodiments are also contemplated such as a single row, more than two rows, etc.

The batteries 82 can be selectively plugged/unplugged into the housing 84 of the battery system 80. The housing 84 supports connectivity between the batteries 82 and to the power distribution 64 as well as monitoring of the batteries 82. In other embodiments, the battery system 80 can omit the housing 84 where the batteries 82 are directly connected to one another and supported, for example, by shelves or simply placed on the ground and on top of one another. The batteries 82 can include a handle 90 or the like for an installer to handle physically.

§ 4.0 Battery Installation Apparatus

Figure 4:
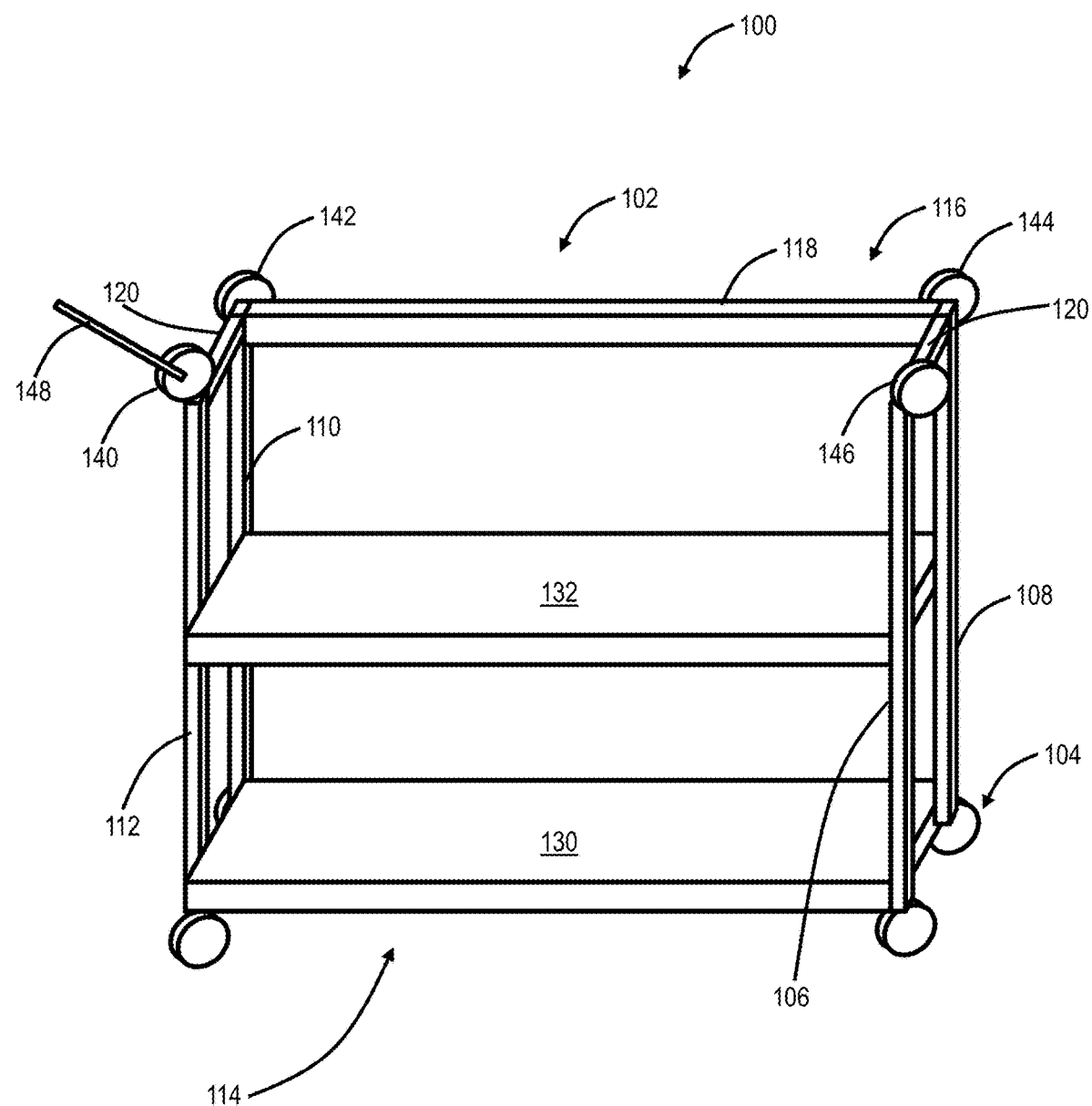
FIG. 4 is a diagram of a battery installation apparatus for assisting in the removal and installation of the batteries in the shelter.

Referring to FIG. 4, in an exemplary embodiment, a diagram illustrates a battery installation apparatus 100 for assisting in the removal and installation of the batteries 82 in the shelter 50. The battery installation apparatus 100 is a maneuverable frame 102 with omnidirectional wheels 104. Specifically, the frame 102 can include four vertical support posts 106, 108, 110, 112 each connected to one of the omnidirectional wheels 104. The shape of the frame 102 is generally rectangular, similar to the battery system 80. A front side 114 of the frame is open, and a rear side 116 includes support bars 118 connected between the posts 108, 110. The sides of the frame 102 include support bars 120 between the posts 110, 112 and the posts 106, 108.

The apparatus 100 can include a fixed bottom shelf 130 connected or disposed to the posts 106, 108, 110, 112. The apparatus 100 can also include a moveable shelf 132. The moveable shelf 132 is adjustable based on four pulleys 140, 142, 144, 146. The pulley 140 includes a handle 148 that is adapted to rotate to move a rope or other winch type mechanism which is connected to the other pulleys 142, 144, 146 as well. Movement of the handle 148 causes the moveable shelf 132 to move vertically evenly in either direction (based on the rotation direction of the handle 148). When the handle 148 is stationary, the moveable shelf 132 remains fixed in place.

The shelves 130, 132 are configured to support the batteries 82. Specifically, the apparatus 100 is dimensioned to support the N batteries 82, sort of like a mobile battery system 80. The moveable shelf 132 is vertically adjusted to match the height of the second row of the batteries 82 in the battery system 80.

In an exemplary embodiment, a battery installation apparatus for installing and removing batteries in a shelter or cabinet includes a frame comprising four posts, wherein the frame is dimensioned to maneuver in the shelter or cabinet; a lower shelf fixed to the frame; an upper shelf moveable on the frame, wherein each of the lower shelf and the upper shelf are dimensioned to support the batteries; and omnidirectional wheels disposed to each of the four posts.

To install the batteries, a plurality of batteries are placed on the lower shelf and the upper shelf; the frame is moved into the shelter or cabinet to a location proximate and adjacent to a battery system in the shelter or cabinet; the upper shelf is adjusted based on the battery system; and each of the plurality of batteries is moved to the battery system. To remove the batteries, the frame is moved into the shelter or cabinet to a location proximate and adjacent to a battery system in the shelter or cabinet; old batteries from the battery system are placed on the upper shelf and the lower shelf; the frame is moved out of the shelter or cabinet; and the old batteries are removed.

The frame can be dimensioned based on a size of the battery system and a size of the shelter or cabinet. The battery installation apparatus can further include a pulley system coupled to the four posts to vertically raise and lower a shelf of the shelves. The pulley system can include a handle which is rotated to move the upper shelf and which holds the upper shelf when the handle is stationary. The battery installation apparatus can include a rectangular shape. The plurality of batteries can include N batteries, N=4, 8, 16, 24, or 48. The battery installation apparatus can be operated by a single installer. The shelter or cabinet can be at a cell site.

§ 5.0 Battery Installation Method

Figure 5:
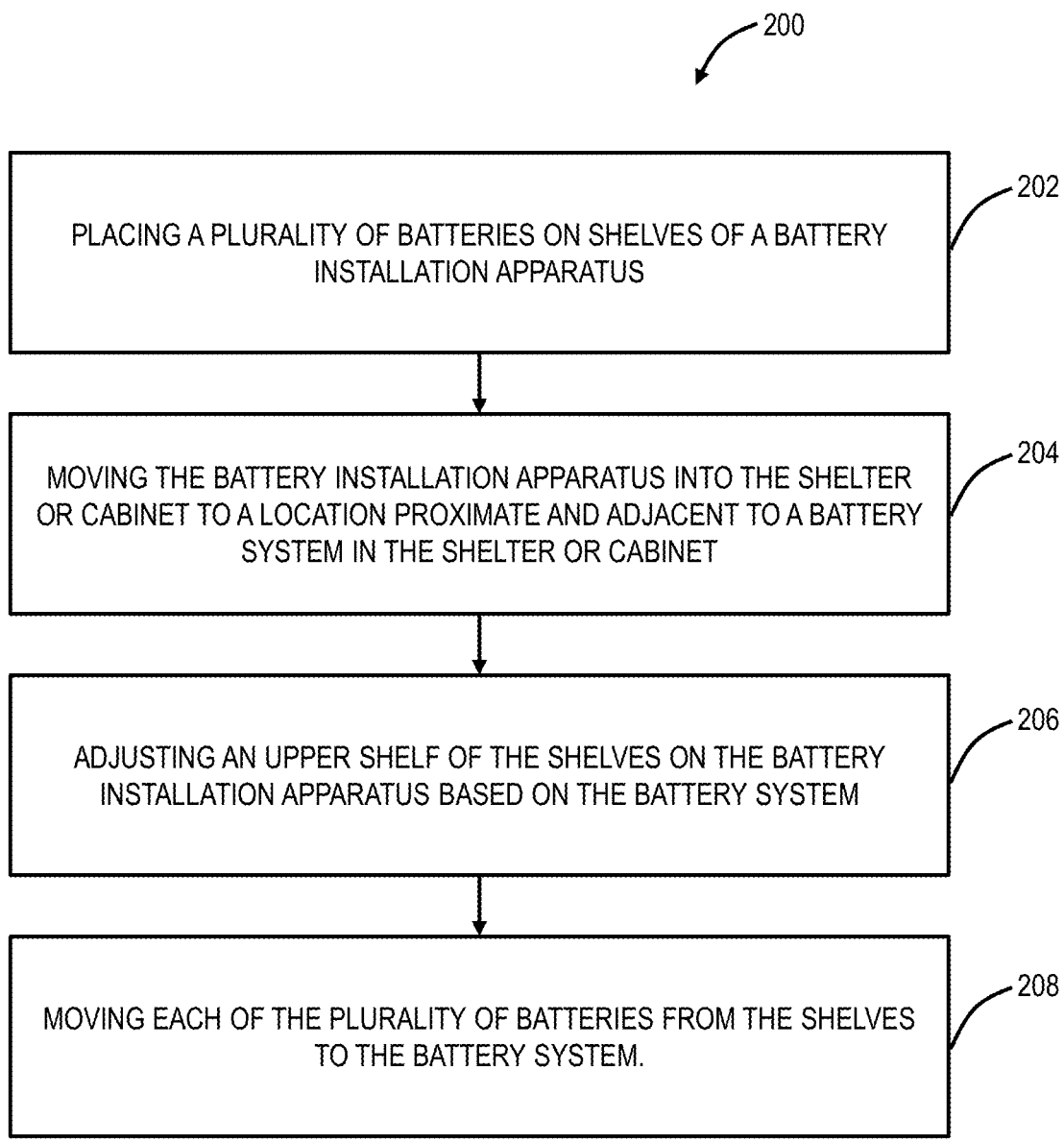
FIG. 5 is a flowchart of a battery installation method for assisting in the removal and installation of the batteries in the shelter using the battery installation apparatus.

Referring to FIG. 5, in an exemplary embodiment, a flowchart illustrates a battery installation method 200 for assisting in the removal and installation of the batteries 82 in the shelter 50 using the battery installation apparatus 100. The battery installation method 200 includes placing a plurality of batteries on shelves of a battery installation apparatus (step 202); moving the battery installation apparatus into the shelter or cabinet to a location proximate and adjacent to a battery system in the shelter or cabinet (step 204); adjusting an upper shelf of the shelves on the battery installation apparatus based on the battery system (step 206); and moving each of the plurality of batteries from the shelves to the battery system (step 208). The battery installation method can further include, prior to step 202, moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The plurality of batteries can include N batteries, N=4, 8, 16, 24, or 48. The method 200 can be performed by a single installer. The shelter or cabinet can be at a cell site.

§ 6.0 Security Screws for Battery Installation

Figure 6:
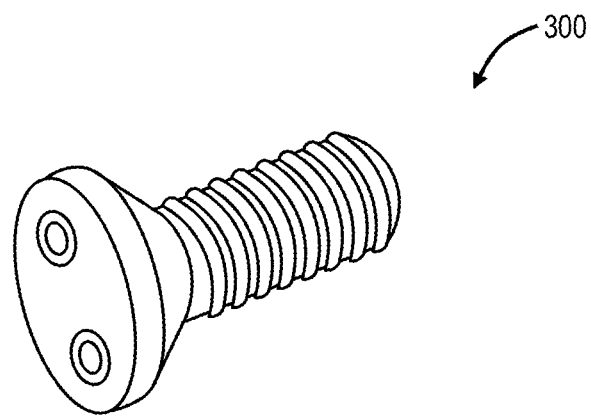
FIG. 6 is a diagram of an example of a security screw.

Referring to FIG. 6, in an exemplary embodiment, a diagram illustrates an example of a security screw 300. As described herein, the security screw 300 and other security screws have unique designs that make them virtually impossible to remove without specialized tools. The security screws can be referred to as tamper proof, tamper resistant, etc. The systems and methods described herein contemplate use of any type of security screw. Common examples of tamper resistant screws are one-way screws, spanner screws, and a tamper-resistant Allen-head screw with a protruding pin keeping regular Allen wrenches from working. A one-way screw has counter-clockwise ramps in the screw's head. A screw-driver turned clockwise engages the screw-head and forces it to rotate, but a screw-driver turned counter-clockwise slides up the ramps and accomplishes nothing. The intention is that the screws can be installed with a standard screw-driver but cannot be easily removed without a special removal tool that digs into the ramps to get a good grip.

A spanner screw has two small holes drilled in its head and is designed to be installed and removed with a special spanner screw-driver. The security screw 300 is an example of a spanner screw. A tamper-resistant Allen-head screw is designed to be removed only with a specially modified Allen wrench having a small hole drilled in its end to accept the protruding pin in the head of the screw. Also, the security screws can have unique, proprietary designs making them more tamper resistant than off-the-shelf variants such as the spanner screw. Again, the systems and methods described herein contemplate use of any type of security screw.

Figure 7:
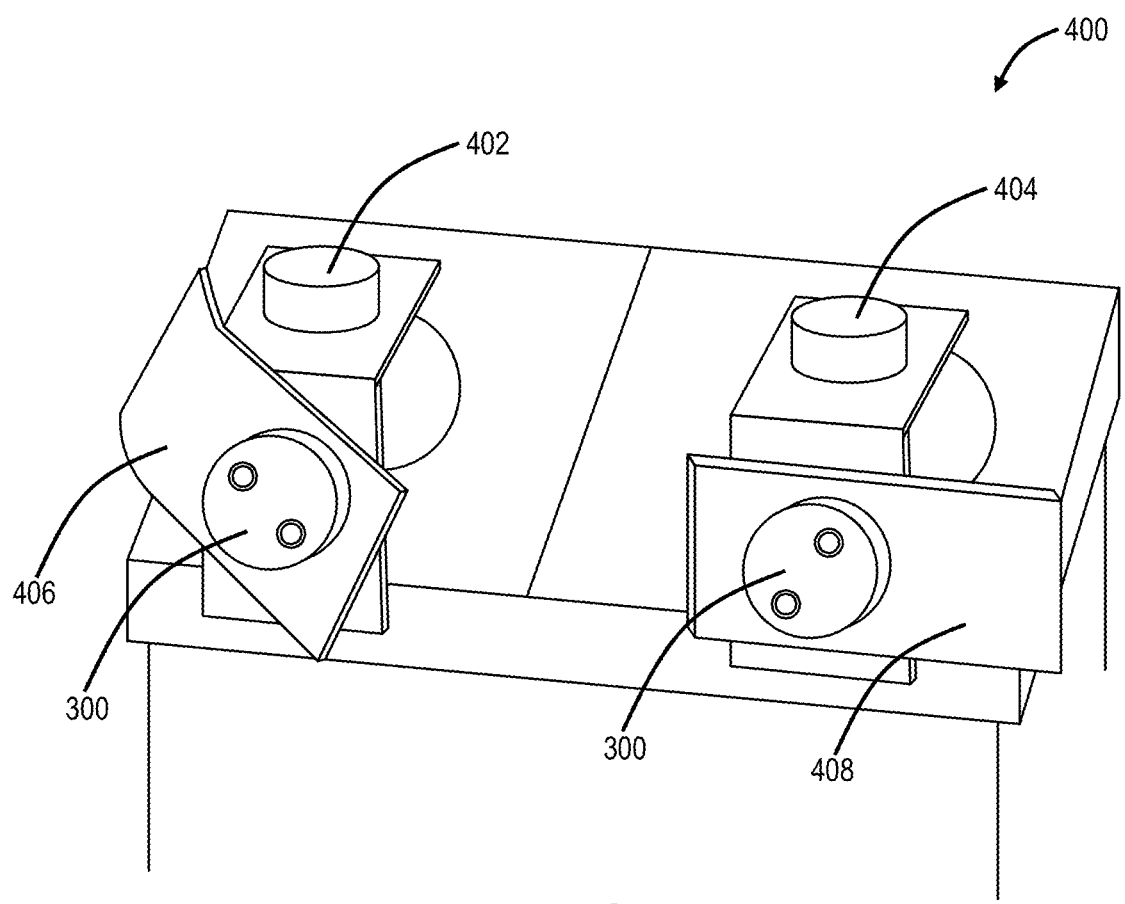
FIG. 7 is a diagram of a battery with security screws attaching terminals to terminal plates.

Referring to FIG. 7, in an exemplary embodiment, a diagram illustrates a battery 400 with security screws 300 attaching terminals 402, 404 to terminal plates 406, 408. The battery 400 can be square or rectangular shaped and the battery 400 can be positioned and installed with the battery installation apparatus 100. The battery 400 includes terminals 402, 404 (e.g., a positive and a negative terminal) which need to be connected to corresponding leads (not shown) to connect the battery 400. Note, the battery 400 can be connected in various ways (e.g., series, parallel, etc.) with other batteries. The terminals 402, 404 are connected to terminal plates 406, 408 respectively and the terminal plates 406, 408 are ultimately connected to the leads. This connection is both a physical connection, locking the battery 400 in place, and an electrical connection.

In the systems and methods, the terminals 402, 404 are physically connected to the terminal plates 406, 408 using the security screws 300 (or any variant of a security, tamper proof, or tamper resistant screw). The security screws 300 are used in lieu of conventional screws. On-site installation personnel are equipped with an associated unique tool to fasten and tighten the security screws 300 physically connecting the terminals 402, 404 with the terminal plates 406, 408. Note, the terminal plates 406, 408 can also be connected at an opposite end via the security screws 300. The security screws 300 have minimal increased cost from conventional screws and add little to no additional installation time. At the same time, the security screws 300 advantageously lock the battery 400 in place, minimizing the risk of theft. That is, once installed, the battery 400 is physically locked and cannot be undone without the unique tool.

Also, paint can be applied over the security screw 300, the terminals 402, 404, and the terminal plates 406, 408 after the security screw 300 is tightened. The paint is for quality control, to show that the steps have been taken to appropriately tighten the security screw 300 (to the specified torque)—assumption is made that if someone takes the trouble to apply the paint, they have appropriately tightened the screw. And, if the paint is applied and dries in place on a tightened security screw 300 and then is found to be broken, the security screw 300 is no longer tight—an easy visual confirmation of appropriately tightened connections.

Figure 8:
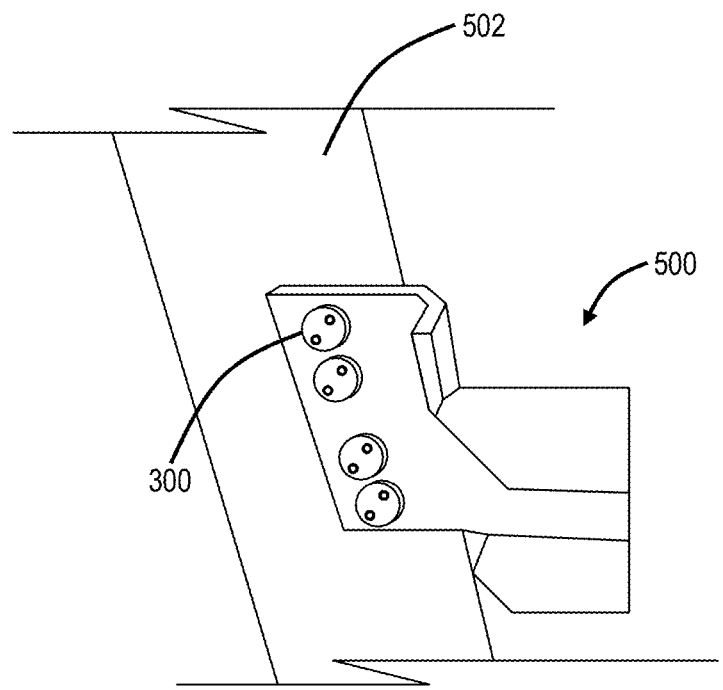
FIGS. 8 and 9 are diagrams of a bracket fastened to a housing via the security screws.
Figure 9:
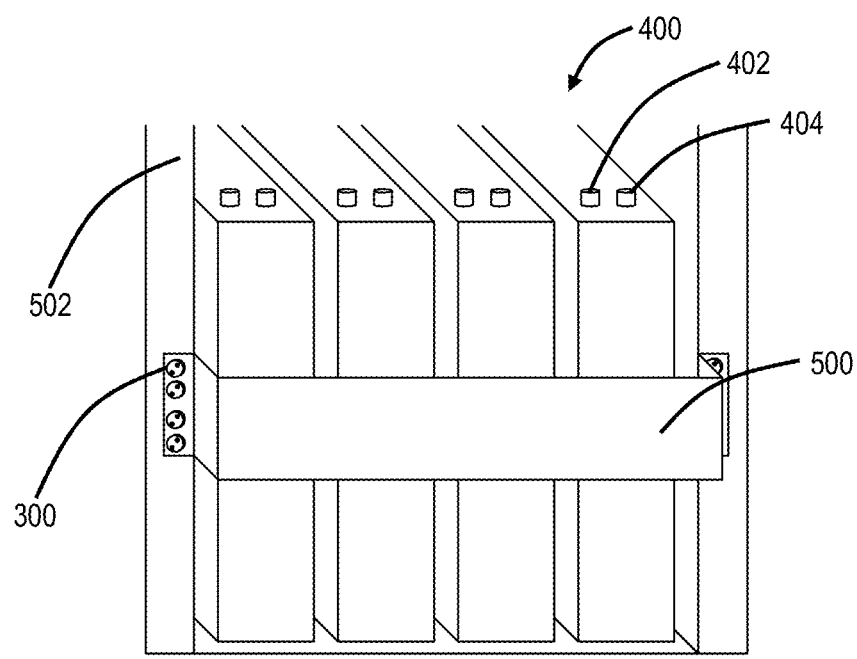
Figure 10:
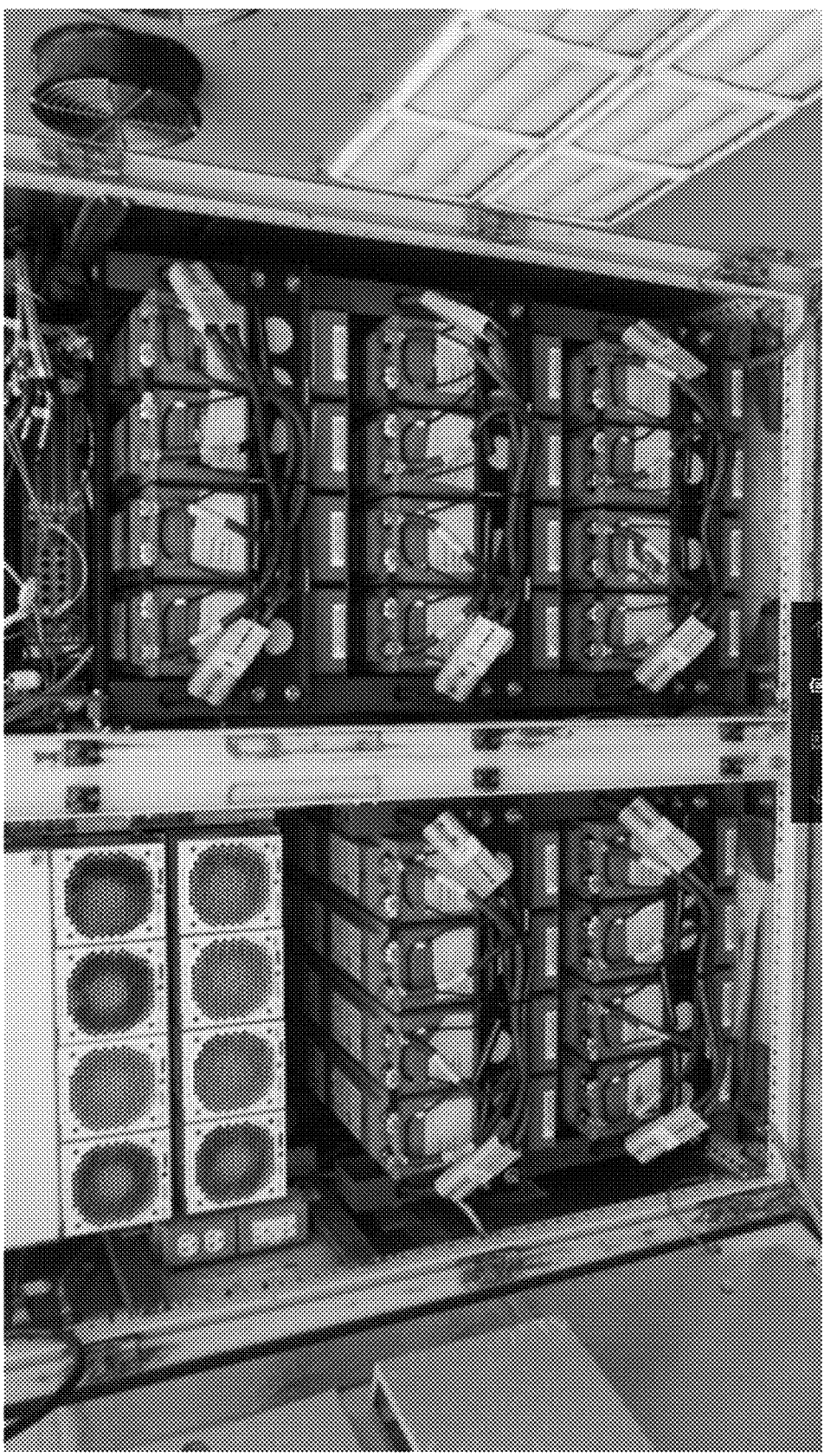
FIG. 10 is a diagram of batteries installed in an outside plant cabinet.

Referring to FIGS. 8 and 9, in an exemplary embodiment, diagrams illustrate a bracket 500 fastened to a housing 502 via the security screws 300. The bracket 500 can be used in conjunction with the security screws 300 between the terminals 402, 404 and the terminal plates 406, 408. The bracket 500 locks the batteries 400 together to a structure, i.e., the housing 502. For example, the housing 502 can be part of a cabinet or the like. FIG. 10 illustrates the batteries 400 installed in an outside plant cabinet. The bracket 500 locks the batteries 400 together as a single unit and provides protection from removal. The bracket 500 can also hold the batteries 400 in place.

Figure 11:
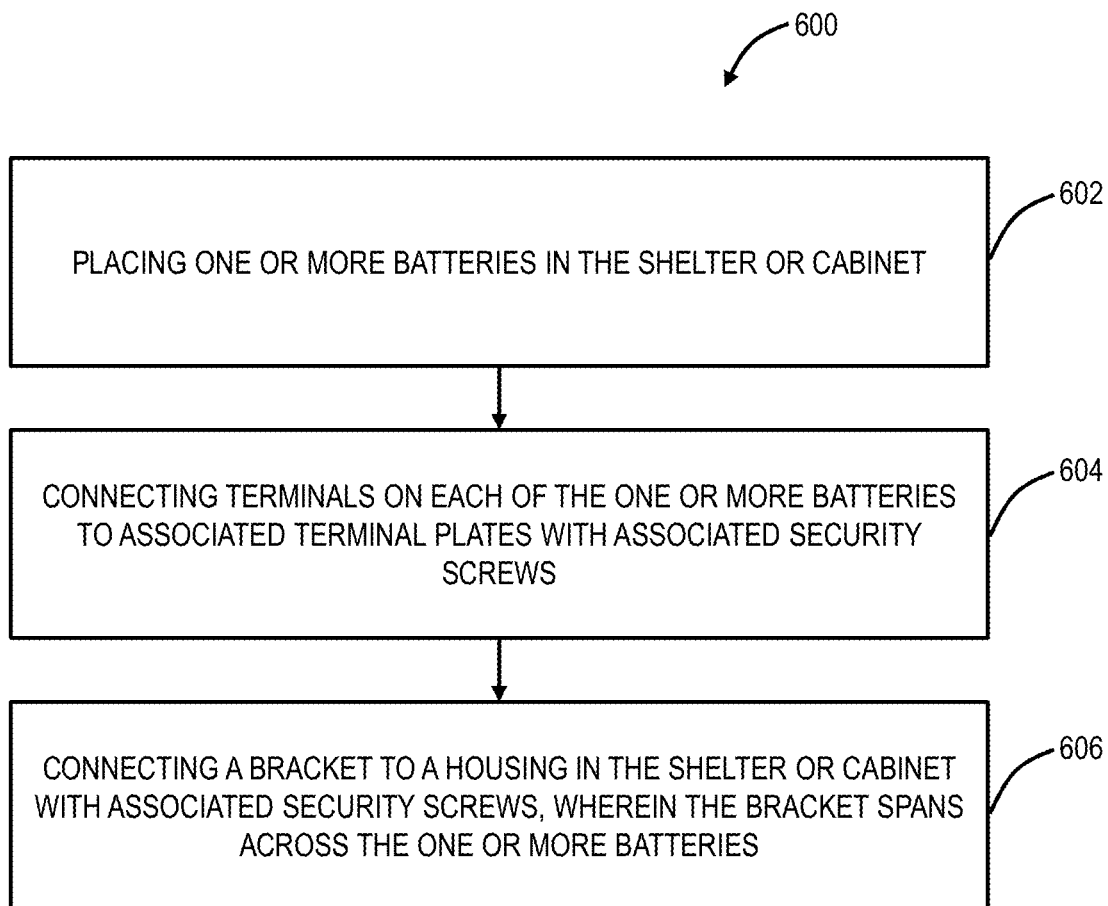

Referring to FIG. 11, in an exemplary embodiment, a flowchart illustrates a battery installation method 600 with security screws for theft deterrence in cell site shelters and the like. The battery installation method 600 includes placing one or more batteries in the shelter or cabinet (step 602); connecting terminals on each of the one or more batteries to associated terminal plates with associated security screws (step 604); and connecting a bracket to a housing in the shelter or cabinet with associated security screws, wherein the bracket spans across the one or more batteries (step 606). The security screws are installed with a unique tool specially designed for the associated security screws to deter tampering. The security screws can include spanner screws, one-way screws, or tamper-resistant Allen-head screws each with a protruding pin. The security screws can include uniquely designed screw heads with a corresponding unique tool.

The placing step 602 can include placing the one or more batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the one or more batteries from the shelves to the battery system. The battery installation method 600 can further include moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The one or more batteries can include N batteries, N=4, 8, 16, 24, or 48. The battery installation method 600 can be performed by a single installer. The shelter or cabinet is at a cell site.

§ 7.0 Used Battery Handling and Recycling

Figure 12:
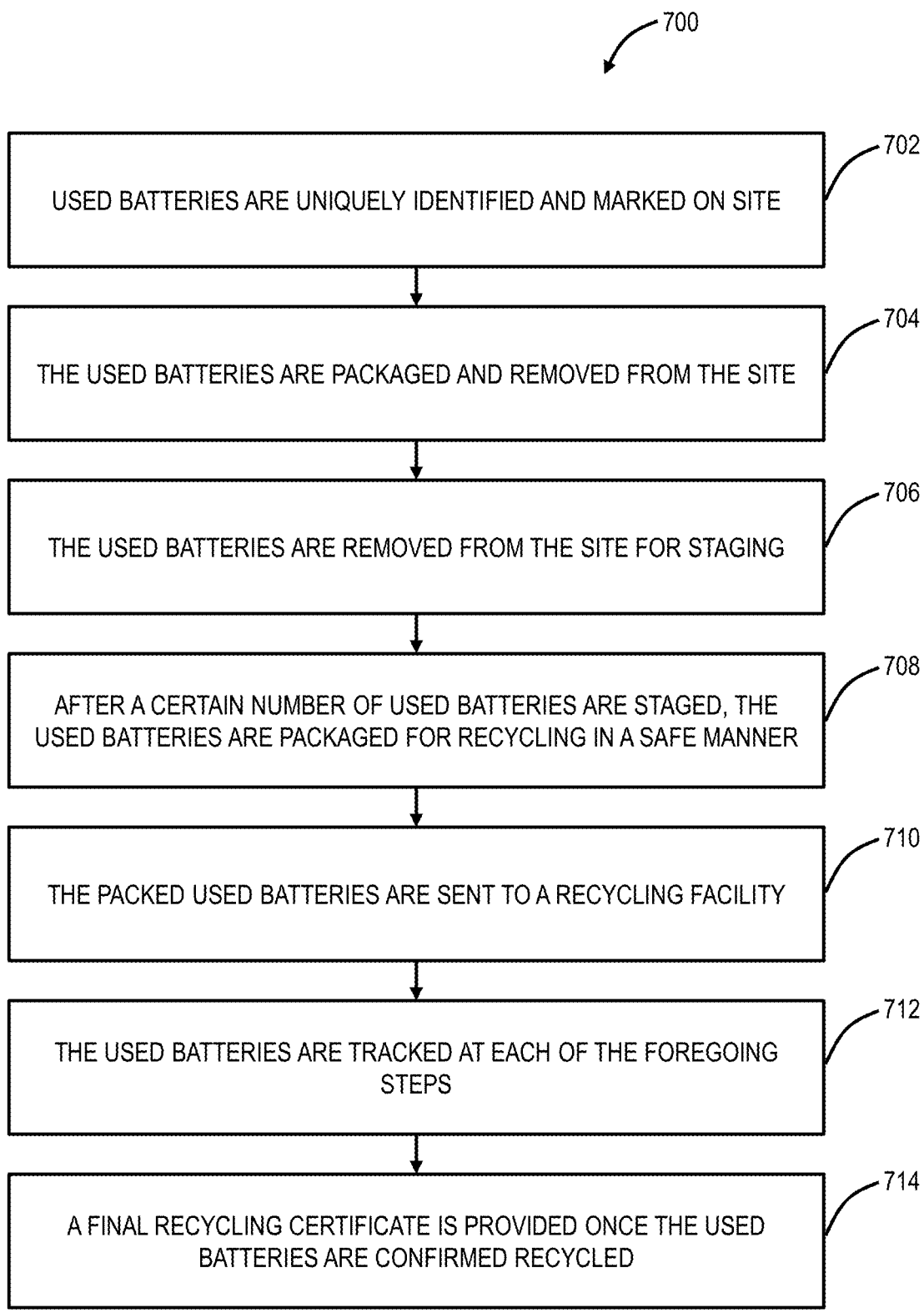
FIG. 12 is a flowchart illustrates a battery recycling method.

Referring to FIG. 12, in an exemplary embodiment, a flowchart illustrates a battery recycling method 700. The battery recycling method 700 is implemented at one or more of the cell sites 10 and a staging location (e.g., a warehouse, etc.) and can utilize the battery installation apparatus 100 and/or the security screws 300. Again, objectives of the battery recycling method 700 include i) safety—ensuring the used batteries are properly removed, stored, and transported, ii) efficiency—dealing with multiple cell sites 10 efficiently, and iii) compliance—ensuring the batteries are properly recycled.

The battery recycling method 700 initiates on site with uniquely identifying and marking used batteries (step 702). Specifically, step 702 includes arriving on site such as at the cell site 10 and identifying the used batteries 82. The used batteries 82 can be uniquely identified or tagged as they are removed from the cell site 10. For example, the battery recycling method 700 can include use of a mobile device 800 which is used to electronically track the used batteries 82. The mobile device 800 can execute an application or browser to communicate/store data on a back-end server or in the cloud related to the uniquely identified and marked batteries 82. For example, a technician assisting in performing the battery recycling method 700 can note the quantity, make, model, etc. of the used batteries via the mobile device 800 and the mobile device 800 can provide this data to the back-end server or the cloud for tracking and compliance. For example, once the data is input in step 702, the technician can confirm prior to, concurrent with, or subsequent to the removal of the batteries 82 for transport from the cell site 10 to a warehouse/temporary staging facility.

Also, as part of the uniquely identifying and marking used batteries, a certificate of recycling can be generated stating that the company performing the battery recycling method 700 has taken ownership of the used batteries 82 along with language that confirms the battery recycling method 700 will be followed and performed to comply with applicable regulations (e.g., Environmental Protection Agency (EPA) guidelines, etc.). The certificate of recycling can also identify the recycling facility, etc. and the purpose of the certificate of recycling is to allow the cell site 10 operator assurances regarding proper procedures and transfer of liability. Again, the certificate of recycling can be electronic, through the back-end server or the cloud.

The used batteries 82 are packaged and removed from the cell site 10 (step 704). The used batteries 82 can any size, e.g., 12V which are about 2-3 times the size of a typical car battery, or the like. For example, the removal of the used batteries 82 can utilize the battery installation apparatus 100 to efficiently remove the batteries 82 from the cell site 10. The used batteries 82 are packaged such as placed on pallets or the like and removed from the cell site 10 for staging, such as at the warehouse/temporary staging facility (step 706). The battery recycling method 700 contemplates the technician or multiple technicians visiting one or more cell sites 10 and performing steps 702, 704 at the cell site 10 and step 706 as a transportation step between the cell site 10 and the warehouse/temporary staging facility. For example, multiple cell sites 10 can be visited for removing batteries 82 before returning to the warehouse/temporary staging facility.

At the warehouse/temporary staging facility, after a certain number of used batteries 82 have been staged, the used batteries 82 are packaged for recycling in a safe manner (step 708). The safe manner includes various steps and packaging to ensure the used batteries 82 can be safely transported to the recycling facility. For example, the packaging must include insulation to protect battery leads from touching metal or the like during transport. The packaging can include a cardboard or wooden box with form fitting slots for each battery 82 and the box can sit on a pallet. Alternatively, the batteries 82 can be directly placed on a pallet such as with an empty sheet of cardboard (or wood or other suitable insulating material) placed on top of the empty pallet. The sheet of cardboard can include markings with lines and with identifiers. The technicians can place each battery 82 on an empty space based on the markings. Also, the associated identifier can be noted, such as through the mobile device 800. For example, battery X which was uniquely identified at cell site A was placed on pallet N in space 1. That is, during the lifecycle of the battery recycling method 700, each time the battery 82 is moved or packaged, this can be noted via the mobile device 800.

Figure 13:
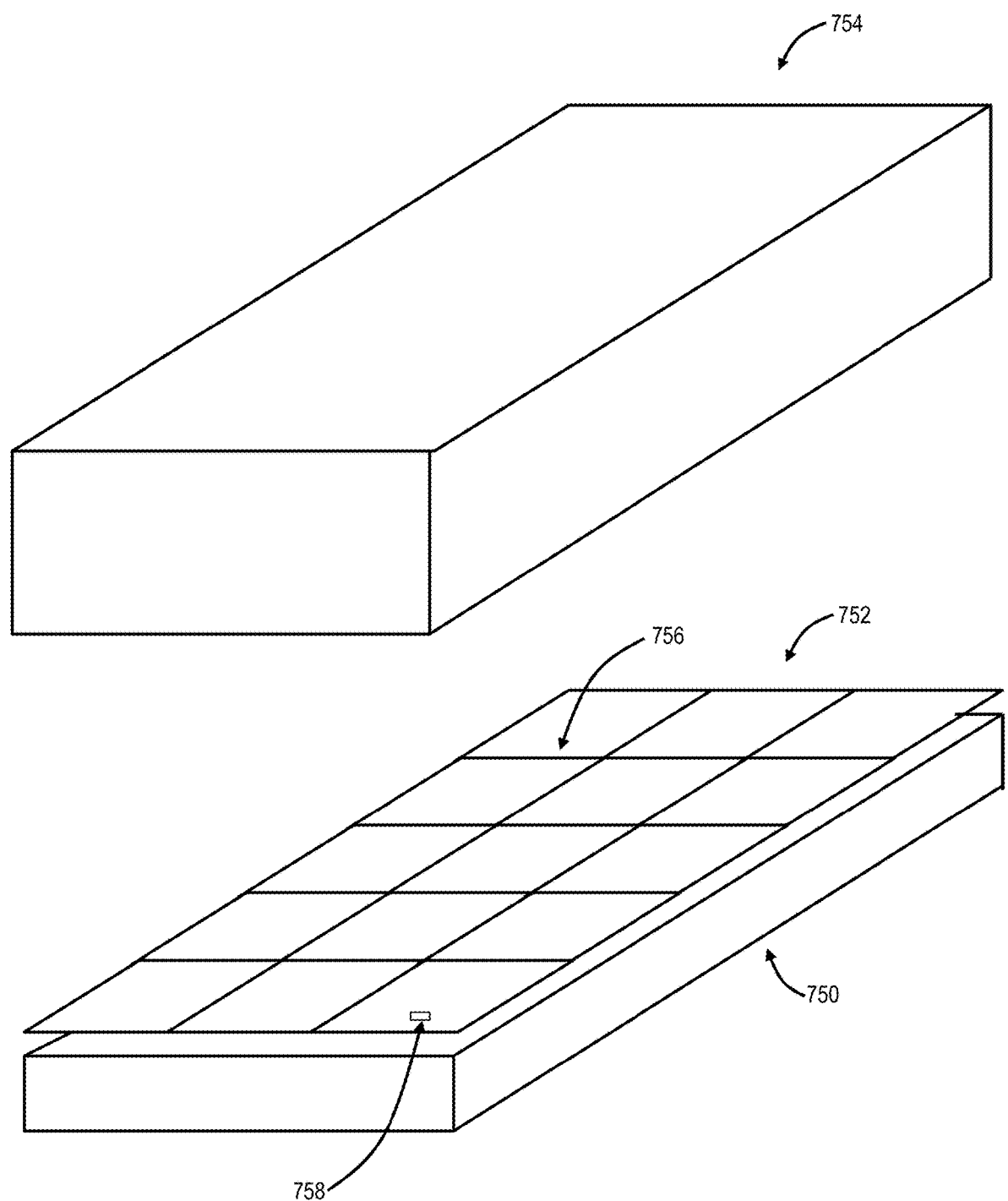
FIG. 13 is a perspective diagram of a pallet, an insulation sheet, and a top sheet without batteries for use in the battery recycling method of FIG. 12.

FIG. 13 is a perspective diagram of a pallet 750, an insulation sheet 752, and a top sheet 754 without the batteries 82. The pallet 750 can be wooden, metal, plastic, etc. and configured to be picked up by a forklift or the like. The insulation sheet 752 can be the empty sheet of cardboard (or wood or other suitable insulating material) placed on top of the empty pallet 750. The insulation sheet 752 includes lines 756 showing where to place each battery 82 and each box can include a unique label 758 for identifying a location of each battery 82 for tracking. Note, the mobile device 800 is described later and those skilled in the art will recognize that the tracking at each step can take various approaches including manual data entry, photos, bar code scanning, RFID, etc.

Once a complete layer of batteries 82 is placed on the pallet 750 or in the box, another sheet of cardboard (or wood or other suitable insulating material) is placed on top of the batteries 82. Further, each of the batteries 82 can have a tape or similar adhesive with insulating properties placed on the terminals to prevent contact or leaking during transport. The layering of the batteries 82 can be repeated until a certain height is achieved on the pallet 750, e.g., three rows. The top layer of batteries 82 can have another sheet of cardboard (or wood or other suitable insulating material) placed on top and this can be referred to as a top sheet of cardboard, i.e., the top sheet 754. Similar to the insulation sheet 752, the top sheet 754 can include an empty sheet of cardboard (or wood or other suitable insulating material). Also, the top sheet 754 can have sides that extend beyond the outer edge of the top row of batteries 82.

Once the top sheet 754 is placed over a full pallet 750, the pallet 750 can be banded through the bottom of the pallet 750 and around the batteries 82 such as using a poly type material strapping to secure the load as a single unit that does not shift during transport. It is important to avoid any metal in strapping down the batteries 82 to avoid any contact with the used batteries 82. The pallet 750 can also be wrapped in shrink wrap or the like covering the outer edges of the top row of batteries 82 down to and including around the outside corner of the pallet 750.

The pallet 750 can be labeled with appropriate information including warnings such as non-combustible and other relevant information such as the site ID and quantity, make, model of batteries and estimated weight for each pallet 750. The pallet 750 can also be labeled with number tracking, e.g., pallet 1 of 15, 2 of 15, etc.

With the label and the completely packed pallet 750, the battery recycling method 700 can include a verification step where a photo is taken of the pallet 750 including the label and this photo can be uploaded to the back-end server or the cloud and correlated with each battery 82 being tracked. This photo can serve as a confirmation that the batteries 82 were packed and loaded on the pallet 750 and are ready to ship.

With packed pallets 750, the packed, used batteries 82 are sent to a recycling facility (step 710). For example, a Bill of Lading (BOL) can be prepared for shipment document the total number of pallets and estimated weight for shipment.

Importantly, the used batteries 82 are tracked at each step in the battery recycling method 700, such as using the mobile device 800 and the back-end server/cloud. Various reports can be generated included an inventory label sheet—an overall document created that shows batteries by pallet #, battery quant, make & model and site origin. Also, this information can be accessible by the cell site owner 10 on demand, e.g., a process map which shows where the used batteries 82 are in the battery recycling method 700.

Once a final recycling certificate is received, the overall document is attached to verify the tracking of batteries at individual level from removal to recycle (step 714). For example, the recycling certificate can be used for liability issues—battery X was found in a landfill and there is a fine or the like—the cell site operator now has a document showing the liability resides with the operator of the battery recycling method 700.

The battery recycling method 700 can be adapted for different service providers and the interface between the back-end server/cloud can be programmed to interface with back office systems for various service providers to automate various data exchanges. Also, the back-end server/cloud can include scheduling applications such as to schedule pick ups, new battery installations, etc.

Exemplary Computing Device

Figure 14:
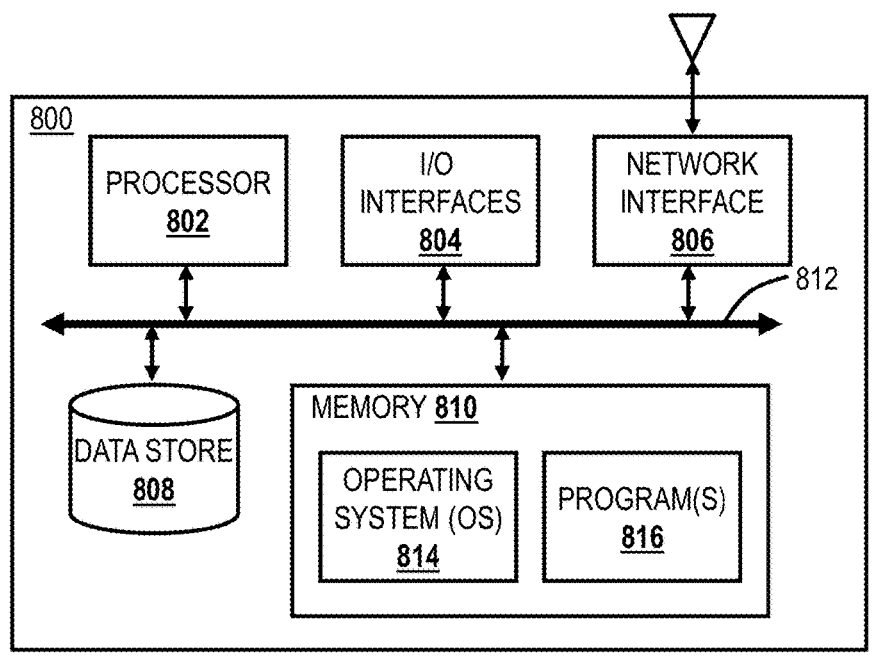
FIG. 14 is a block diagram illustrates a mobile device or general computing device, which may be used for the tracking aspects of the battery recycling method and the back-end server/cloud.

Referring to FIG. 14, in an exemplary embodiment, a block diagram illustrates a mobile device 800 or general computing device, which may be used for the tracking aspects of the battery recycling method 700 and the back-end server/cloud. The mobile device 800 can be a digital device that, in terms of hardware architecture, generally includes a processor 802, input/output (I/O) interfaces 804, a network interface 806, a data store 808, and memory 810. It should be appreciated by those of ordinary skill in the art that FIG. 14 depicts the mobile device 800 in an oversimplified manner, and a practical embodiment may include additional components and suitably configured processing logic to support known or conventional operating features that are not described in detail herein. The components (802, 804, 806, 808, and 802) are communicatively coupled via a local interface 812. The local interface 812 can be, for example, but not limited to, one or more buses or other wired or wireless connections, as is known in the art. The local interface 812 can have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The processor 802 is a hardware device for executing software instructions. The processor 802 can be any custom made or commercially available processor, a central processing unit (CPU), an auxiliary processor among several processors associated with the mobile device 800, a semiconductor-based microprocessor (in the form of a microchip or chip set), or generally any device for executing software instructions. When the mobile device 800 is in operation, the processor 802 is configured to execute software stored within the memory 810, to communicate data to and from the memory 810, and to generally control operations of the mobile device 800 pursuant to the software instructions. In an exemplary embodiment, the processor 802 may include a mobile-optimized processor such as optimized for power consumption and mobile applications. The I/O interfaces 804 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 804 can include a graphical user interface (GUI) that enables a user to interact with the mobile device 810. Additionally, the I/O interfaces 804 may further include an imaging device, i.e. camera, video camera, etc. used to obtain data such as from a barcode, Quick Response (QR) code, etc.

The network interface 806 enables wireless communication to an external access device or network. Any number of suitable wireless data communication protocols, techniques, or methodologies can be supported by the network interface 806, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. For the back-end server/cloud, the network interface 806 can include a wired network interface such as an Ethernet variant. The data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 may incorporate electronic, magnetic, optical, and/or other types of storage media.

The memory 810 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 810 may incorporate electronic, magnetic, optical, and/or other types of storage media. Note that the memory 810 may have a distributed architecture, where various components are situated remotely from one another but can be accessed by the processor 802. The software in memory 810 can include one or more software programs, each of which includes an ordered listing of executable instructions for implementing logical functions. In the example of FIG. 14, the software in the memory 810 includes a suitable operating system (O/S) 814 and programs 816. The operating system 814 essentially controls the execution of other computer programs and provides scheduling, input-output control, file and data management, memory management, and communication control and related services. The programs 816 may include various applications, add-ons, etc. configured to provide end user functionality with the mobile device 800. For example, exemplary programs 816 may include, but not limited to, a web browser, social networking applications, streaming media applications, games, mapping and location applications, electronic mail applications, and the like. In a typical example, the end user typically uses one or more of the programs 816 along with a network connection to the back-end server/cloud. The programs 816 can include a tracking app which is used during the battery recycling method 700.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A battery recycling method used to recycle used batteries from a plurality of cell sites, the battery recycling method comprising the steps of:

uniquely identifying and marking the used batteries at the plurality of cell sites, wherein each of the used batteries is uniquely identified and marked prior to packaging and transporting a battery from its corresponding cell site to a staging facility;

storing data related to each of the uniquely identified used batteries on one of a back-end server and a cloud system;

removing the used batteries from the plurality of cell sites including packaging and transporting the used batteries from the plurality of cell sites to the staging facility;

re-packaging the transported used batteries at the staging facility with an insulation material, the insulation material including an insulation sheet positioned between a pallet and the used batteries, the insulation sheet including markings thereon of the where to place the used batteries on the insulation sheet;

providing the re-packaged used batteries from the staging facility to a recycling facility;

tracking the used batteries at each foregoing step each leg of transportation using the data stored on the one of the back-end server and the cloud system; and providing one or more recycling certificates to one or more operators of the plurality of cell sites evidencing successful recycling of the used batteries, the recycling certificates being generated using the data stored on the one of the back-end server and the cloud system.

2. The battery recycling method of claim 1, wherein the step of tracking is performed via a mobile device in communication with the one of the back-end server and the cloud system.

3. The battery recycling method of claim 1, wherein the one of the back-end server and the cloud system is integrated with a system associated with the one or more operators for communicating status, providing the recycling certificate, and for scheduling the battery recycling.

4. The battery recycling method of claim 1, further comprising the step of:
provinding a notification to the one or more operators prior to, concurrent with, or subsequent to the step of removing the used batteries, wherein the notification provides an indication that a provider performing the battery recycling method has taken ownership of the used batteries.

5. The battery recycling method of claim 1, wherein the step of removing the used batteries utilizes a battery installation apparatus to physically move the used batteries out of the plurality of cell sites, wherein the battery installation apparatus comprises a plurality of adjustable shelves and omnidirectional wheels.

6. The battery recycling method of claim 1, wherein the step of re-packaging the transported used batteries comprises the steps of:
placing the insulation sheet on an empty pallet;
placing the used batteries on the insulation sheet based on the markings thereon; and
repeating the step of placing the used batteries to create a plurality of rows of the used batteries on the pallet.

7. The battery recycling method of claim 6, wherein the plurality of rows has insulation sheets therebetween and a top row has one of a top insulation sheet, a piece of cardboard, and a piece of wood on top of each of the used batteries including connectors thereof.

8. The battery recycling method of claim 6, wherein the method further comprises applying a label to the pallet loaded with the used batteries which identifies where each of the used batteries is loaded on the pallet and storing further data identifying where each of the used batteries is loaded on the pallet on the one of the back-end server and the cloud system.

9. The battery recycling method of claim 6, wherein the step of re-packaging the transported used batteries further comprises the steps of:
placing a strap made of insulating material to tie down the used batteries on the pallet; and
wrapping the pallet with shrink wrap.

10. The battery recycling method of claim 6, wherein the step of re-packaging the transported used batteries further comprises the step of:
placing a piece of insulating tape over each terminal on the used batteries.

11. The battery recycling method of claim 1, wherein the step of tracking the used batteries further comprises the step of adding a list of battery quantity, make, model, and weight from each corresponding cell site to the recycling certificate indicating a clear chain of custody from the plurality of cell sites through a final disposal.

* * * * *